Dec. 7, 1965     H. MAHN     3,221,628
DEPTH-OF-FIELD INDICATOR FOR VARIFOCAL OBJECTIVE
Filed Dec. 22, 1961     2 Sheets-Sheet 1
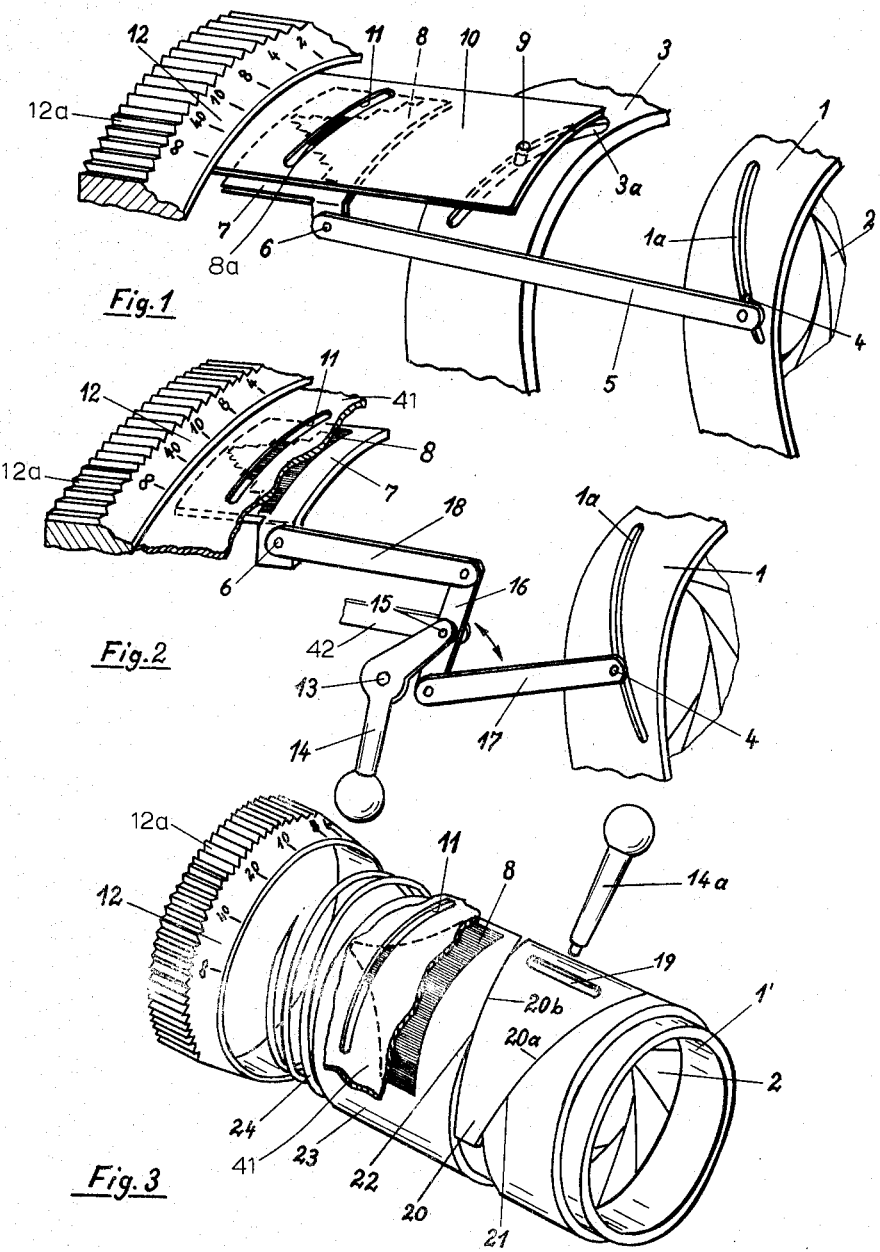
INVENTOR:
Herbert MAHN
BY
AGENT United States Patent Office 3,221,628
Patented Dec. 7, 1965

3,221,628
DEPTH-OF-FIELD INDICATOR FOR
VARIFOCAL OBJECTIVE
Herbert Mahn, Kreuznach, Rhineland, Germany, assignor to Josef Schneider & Co. Optische Werke, Kreuznach, Rhineland, Germany, a corporation of Germany
Filed Dec. 22, 1961, Ser. No. 161,660
10 Claims. (Cl. 95—45)

My present invention relates to a photographic or cinematographic camera objective of the type in which one or more components are axially displaceable to change the focal length of the system.

In ordinary objectives with substantially fixed focal lengths it is known to provide means for indicating on a distance scale, usually the one used also for focusing purposes, the depth of field realizable with different diaphragm stops. In commonly owned U.S. Patent No. 2,949,836 to Albert Baab, for example, there has been disclosed a system in which a distance scale carried on a rotatable focusing ring co-operates with an indicator member that is axially displaceable under the control of a diaphragm-setting ring and has a distinctively marked surface portion viewable through a narrow window adjacent the scale whereby only a strip-like zone of that surface portion, varying in length with the diaphragm setting, is exposed in any position of adjustment. The range indicated by this contrastingly colored or otherwise distinctive strip also shifts upon rotation of the focusing ring with the distance scale carried thereon.

When the objective is of the varifocal type, a further parameter, i.e. the selected focal length, enters into the determination of the depth-of-field range. It is, therefore, the general object of my present invention to provide means for modifying the reading of a depth-of-field indicator in response to changes of the varifocal setting.

A more particular object of the instant invention is to provide a depth-of-field indicator responsive to three distinct parameters, namely focal adjustment (e.g. as conventionally determined by the setting of a limitedly displaceable front lens), focal length (as established by the axial position of one or more objective components rearwardly of that front lens) and relative aperture (depending upon a selected diaphragm stop).

In accordance with this invention there is provided, in a varifocal objective for photographic or cinematographic cameras, an assembly with two degrees of freedom including one or more elements adapted to be selectively displaced, according to a pre-established law, by a first setting member serving for the adjustment of the diaphragm aperture and by a second setting member serving for the selection of a desired focal length, the controlled element or elements indicating on a distance scale the depth-of-field range corresponding to a particular combination of adjustments. The distance scale may, as in conventional systems, be rotatable on or by a focusing ring or equivalent distance selector.

The two degrees of freedom may be respectively assigned to a pair of co-operating elements such as a distinctively marked indicator member, e.g. as shown in the aforementioned Baab patent, and a co-operating working member carrying a window; they may, however, also exist in a single transmission element such as a pinion carried on a rotatable supporting ring or a lever provided with a floating fulcrum, such transmission element being included in the linkage between the aforedescribed controls and the indicator means coacting with the distance scale. In the latter instance it will be desirable to provide for greater mobility, i.e. less frictional restraint, in the output connection of the transmission element (i.e. the connection leading to the indicator means) than in its two input connections; among the latter two, in turn, the connection leading to the diaphragm control preferably encounters greater frictional resistance than that leading to the focal-length control.

The above and other objects, features and advantages of my invention will become more fully apparent in the following detailed description of some embodiments, reference being made to the accompanying drawing in which:

FIG. 1 is a perspective view of part of a camera objective representing an indicator assembly according to the invention;

FIG. 2 is a view similar to FIG. 1, illustrating a modification;

FIG. 3 is a perspective view of a further embodiment of the present invention;

Figure 4:
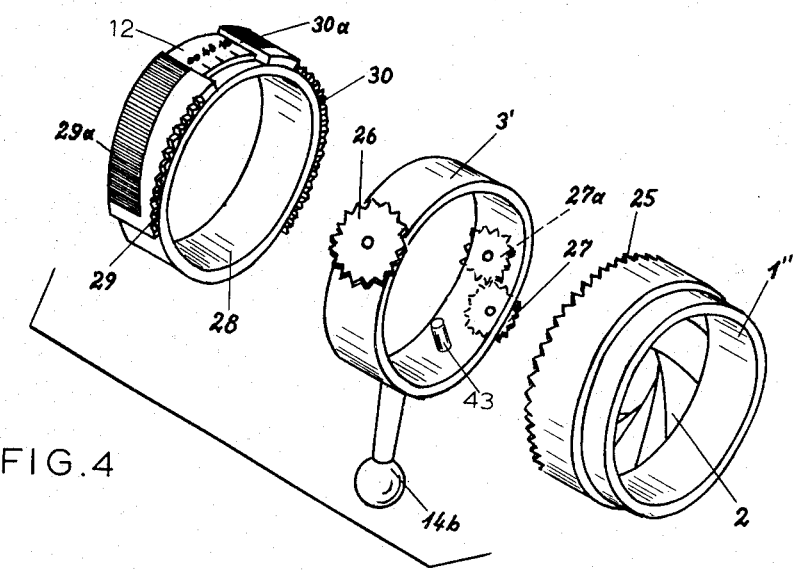
FIG. 4 is an exploded perspective view of still another indicator assembly according to the invention.

For the sake of clarity I have omitted in the drawing all the conventional parts of a varifocal objective, such as the usual lens barrel and the fixed and movable optical components therein, which are not necessary for an understanding of the invention and do not form part of the combination claimed hereinatfer.

The system shown in FIG. 1 comprises a setting ring 1 for an iris diaphragm 2 and another setting ring 3 for the axial displacement of the movable objective components (not shown). Rings 1 and 3 are provided with respective camming slots 1a and 3a, the slots 1a receiving a pin 4 on a link 5 whereas the slots 3a accommodates a similar pin 9 on a masking plate 10 provided with an elongated transverse window slot 11. Link 5 is articulated at its end remote from ring 1, via a pin 6, to an indicator plate 7 bearing a distinctively colored area 8 of stepped configuration of which only a narrow zone is visible through the window 11 of plate 10. This window extends adjacent a distance scale 12 on a focusing ring 12a, the visible strip 8a delimiting on scale 12 a range of distance constituting the depth-of-field of the objective, i.e. the region within which sharp focusing obtains with a particular setting of controls 1, 3 and 12a. A comparison between the system and that of the above-mentioned Patent No. 2,949,836 shows that member 7 corresponds, in substance, to plate d of the patent but that slot 11, unlike window e of the earlier structure, is not formed in a fixed housing portion but has been provided on a member 10 which is also axially displaceable, independently of member 7, by virtue of its camming engagement with setting ring 3. It will be noted that such axial displacement will be relatively limited so that window 11 will always lie close enough to scale 12 to enable a convenient reading of the indicated depth-of-field range thereon.

As will be readily understood, any rotation of ring 12a without changing the settings of rings 1 and 3 will center the depth-of-field range (as measured by strip 8a) upon a different scale portion so as to shift the proximal and distal limits of the focusing range in one or the other direction.

In FIG. 2, in which identical reference numerals have been used for corresponding parts, the rigid link 5 has been replaced by an articulated linkage consisting of a central lever 16, an arm 17 which is pivoted to the lower extremity of that lever and engages the camming slot 1a by means of the pin 4, and an arm 18 which is pivoted to the upper extremity of lever 16 and is hinged to the plate 7 by the pin 6. Lever 16 has an intermediate point floatingly fulcrumed on a handle 14 via a pin 15, this handle in turn having a fixed fulcrum 13 on the objective housing of which a portion, carrying the slot 11, is shown at 41. A link 42 extends from the pin 15 to the movable objective components which are thus directly controlled by the handle 14.

It will be noted that in FIG. 2 the slot 11 is stationary but that the plate 7, bearing the indicating area 8, has been given two degrees of freedom by having been coupled through arm 18 with the lever 16 whose own position is separately adjustable by handle 14 and setting ring 1. The operation is analogous to that of the system of FIG. 1.

In FIG. 3 the handle 14a serving for the focal-length adjustment is swingable about the objective axis and traverses an axially extending slot 19 in a wedge-shaped ring segment 20 having convergent edges 20a and 20b. These edges are in camming engagement with respective edges 21, 22 of a modified, axially fixed diaphragm-setting ring 1' and an axially adjustable but nonrotatable ring 23 which bears the indicating area 8. The independent rotatability of members 1' and 20 again establishes a mechanism with two degrees of freedom for the displacement of indicator member 23 against the force of a compression spring 24.

In FIG. 4 the distance scale 12 is carried on a focusing ring 28 on which two preferably transparent but darkly shaded marking segments 29a, 30a are independently rotatable so as slightly to obscure the underlying scale portions. Segments 29a and 30a are provided with gear teeth 29, 30 meshing with respective planetary pinions 26 and 27a. These pinions, carried on a setting ring 3' for rotation about respective axes generally perpendicular to the objective axis, also engage gear teeth 25 on a diaphragm-setting ring 1", this engagement being direct in the case of pinion 26 and through the intermediary of a reversing pinion 27 in the case of pinion 27a. Ring 3', also shown provided with a stud 43 forming a part of its linkage with the axially displaceable components of the varifocal objective, is rotatable about the objective axis by a handle 14b.

In operation, as will be readily apparent, a rotation of either handle 14b or ring 1" around the objective axis will cause mutually opposite rotation of the segments 29a and 30a to change the limits of the depth-of-field range marked off on the scale 12. The differential assembly 3', 26, 27, 27a again affords two degrees of freedom for the indicator means associated with scale 12.

Figure 5:
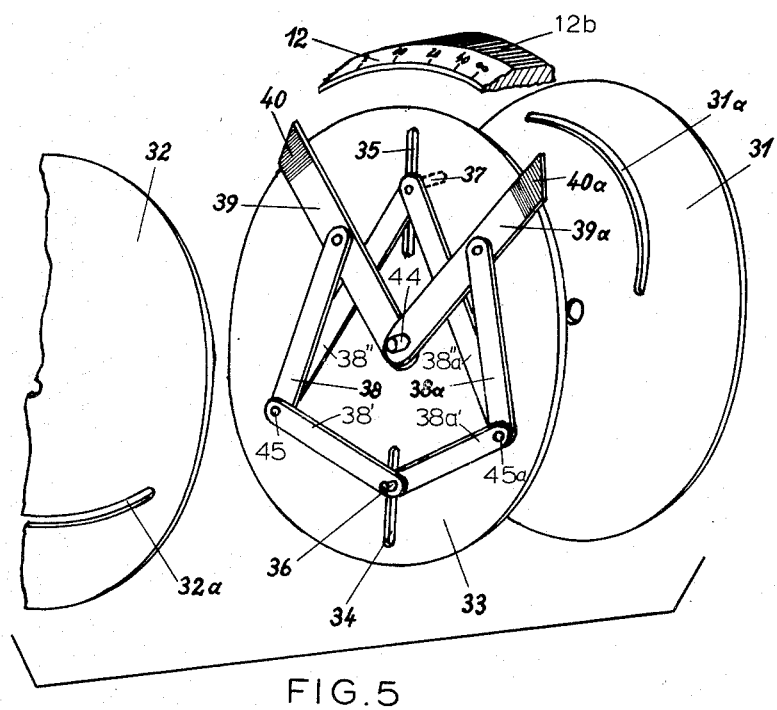
FIG. 5 illustrates, again in exploded perspective view, yet a further modification.

FIG. 5 shows in exploded view a dual control knob for separate selection of the diaphragm stop and the focal length of an associated varifocal objective. The two control members provided for this purpose are a pair of coaxial disks 31, 32 independently rotatable about a central stud 44 on a stationary supporting disk 33. The latter is provided with two diametrically aligned radial slots 34, 35 for the guidance of respective pins 36 and 37, these pins further engaging a camming slot 32a in disk 32 and a camming slot 31a in disk 31, respectively. Pin 36 forms a common pivot for a pair of arms 38', 38a' whereas pin 37 similarly interlinks a pair of arms 38", 38a", the other extremities of arms 38', 38" being articulated at 45 to each other and to an end of a further arm 38 whereas the corresponding extremities of arms 38', 38" are similarly articulated at 45a to each other and to an end of an arm 38a. The other ends of arms 38 and 38a are hinged to a pair of indicator arms 39, 39a which are pivotable about the stud 44 and whose free ends 40, 40a serve as pointers to indicate the depth-of-field limits on scale 12. The ring 12b carrying the scale 12 may again serve as or be coupled with an element for focusing the objective, e.g. by conventionally changing the axial position of a front lens thereof.

The aforestated relationship of the frictional resistances applies particularly to the input connections 14, 17 and the output connection 18 of FIG. 2, the input connections 1', 14a and the output connection 23 of FIG. 3, the input connections 1", 14b and the output connection 29, 30 of FIG. 4, and the input connections 36, 37 and the output connection 39, 39a of FIG. 5; they are, however, equally applicable to equivalent dual-input transmissions with positively and/or frictionally acting linkages.

My invention is, of course, not limited to the specific embodiments described and illustrated but may be realized in various modifications without departing from the spirit and scope of the appended claims.

I claim:
1. In a camera objective having first control means for adjusting the aperture of a variable diaphragm in said objective and second control means for displacing a movable component of said objective to change its focal length, the combination therewith of a carrier provided with a distance scale, co-operating means for registering on said scale a variable distance range representing depth of field, said co-operating means comprising a swingable transmission element with a displaceable fulcrum, first link means coupling said element with said first control means for swinging said element about said fulcrum to impart to said co-operating means an adjustment correlated with diaphragm aperture, and second link means coupling said fulcrum with said second control means for displacement of said element to impart to said co-operating means a corrective adjustment correlated with focal length.

2. The combination according to claim 1 wherein said transmission element comprises lever means articulated at a first point to said first link means, at a second point to said second link means and at a third point to said indicator means.

3. The combination according to claim 2 wherein said indicator means comprises a pair of arms articulated together and joined to said lever means for opposite rotation about their junction.

4. In a camera objective having focusing means, first control means for adjusting the aperture of a variable diaphragm in said objective and second control means for displacing a movable component of said objective to change its focal length, the combination therewith of a movable carrier provided with a distance scale and coupled with said focusing means, co-operating means for registering on said scale a variable distance range representing depth of field, said co-operating means comprising a swingable transmission element with a displaceable fulcrum, first link means coupling said element with said first control means for swinging said element about said fulcrum to impart to said co-operating means an adjustment correlated with diaphragm aperture, and second link means coupling said fulcrum with said second control means for displacement of said element to impart to said co-operating means a corrective adjustment correlated with focal length.

5. The combination according to claim 4 wherein said co-operating means includes an indicator member with a distinctively marked surface portion and a masking member overlying said indicator member while having a narrow window exposing a limited zone of said surface portion, the extent of said zone varying in different relative positions of said members, one of said members being movable and coupled with said transmission element, the other of said members being stationary.

6. The combination according to claim 5 wherein said transmission element is a lever articulated at one point remote from its fulcrum to said first link means and at another point remote from its fulcrum to said movable member.

7. The combination according to claim 4 wherein the connection between said transmission element and said second link means is subject to less frictional restraint than the connection between said transmission element and said first link means.

8. The combination according to claim 4 wherein said second link means comprises a body rotatable about a first axis and carrying said fulcrum, said first link means including first gear means rotatable about said first axis adjacent said body, said transmission element being a planetary gear on said body meshing with said first gear means and rotatable about said fulcrum, said co-operating means including second gear means rotatable about said axis in mesh with said planetary gear.

9. In a camera objective having first control means for adjusting the aperture of a variable diaphragm in said objective and second control means for displacing a movable component of said objective to change its focal length, the combination therewith of a carrier provided with a distance scale, indicator means positioned adjacent said scale for registering thereon a variable distance range representing depth of field, a transmission element with two degress of freedom operatively connected at one location to said indicator means, first link means operatively engaging said element at another location and connecting it with said first control means for displacement along one of said degrees of freedom to impart to said indicator means an adjustment correlated with diaphragm aperture, and second link means operatively engaging said element at a further location and connecting it with said second control means for displacement along the other of said degrees of freedom to impart to said indicator means a corrective adjustment correlated with focal length, said first and second link means being less readily displaceable than said indicator means by said element.

10. In a camera objective having focusing means, first control means for adjusting the aperture of a variable diaphragm in said objective and second control means for displacing a movable component of said objective to change its focal length, the combination therewith of a movable carrier provided with a distance scale and coupled with said focusing means, indicator means positioned adjacent said scale for registering thereon a variable distance range representing depth of field, a transmission element with two degrees of freedom operatively connected at one location to said indicator means, first link means operatively engaging said element at another location and connecting it with said first control means for displacement along one of said degrees of freedom to impart to said indicator means an adjustment correlated with diaphragm aperture, and second link means operatively engaging said element at a further location and connecting it with second control means for displacement along the other of said degrees of freedom to impart to said indicator means a corrective adjustment correlated with focal length, said first and second link means being less readily displaceable than said indicator means by said element.

References Cited by the Examiner

UNITED STATES PATENTS 1,202,607   7/1959   France.

FOREIGN PATENTS 7,202,607   7/1959   France.

JOHN M. HORAN, *Primary Examiner.*

NORTON ANSHER, *Examiner.*